(12) United States Patent
Parker et al.

(10) Patent No.: US 9,783,375 B2
(45) Date of Patent: Oct. 10, 2017

(54) LANE FORMING APPARATUS

(71) Applicant: KAUFMAN ENGINEERED SYSTEMS, INC., Waterville, OH (US)

(72) Inventors: Jon Parker, Sylvania, OH (US); Aaron Peper, Bowling Green, OH (US)

(73) Assignee: KAUFMAN ENGINEERED SYSTEMS, INC., Waterville, OH (US)

( * ) Notice: Subject to any disclaimer, the term of this patent is extended or adjusted under 35 U.S.C. 154(b) by 24 days.

(21) Appl. No.: 14/817,228

(22) Filed: Aug. 4, 2015

(65) Prior Publication Data

US 2016/0046452 A1 Feb. 18, 2016

Related U.S. Application Data

(60) Provisional application No. 62/036,531, filed on Aug. 12, 2014.

(51) Int. Cl.

| B65G 47/71 | (2006.01) |
|---|---|
| B65G 47/52 | (2006.01) |
| B65G 47/24 | (2006.01) |
| B65G 47/00 | (2006.01) |
| B65G 21/20 | (2006.01) |

(52) U.S. Cl.
CPC .................................... *B65G 47/71* (2013.01)

(58) Field of Classification Search
None
See application file for complete search history.

(56) References Cited

U.S. PATENT DOCUMENTS

| 4,830,173 A | | 5/1989 | Hartness et al. | |
|---|---|---|---|---|
| 4,880,104 A | * | 11/1989 | Evans | B65B 59/005 198/445 |
| 5,374,151 A | * | 12/1994 | Matthews | B65G 67/20 414/343 |
| 5,518,106 A | * | 5/1996 | Allard | B27B 31/00 198/459.5 |
| 5,937,995 A | | 8/1999 | Hartness et al. | |
| 5,944,165 A | | 8/1999 | Mannlein et al. | |
| 6,206,174 B1 | | 3/2001 | Koltz | |

(Continued)

OTHER PUBLICATIONS

Alliance Industrial Co.; Alliance Industrial Servo Laner & Tier Forming Device; Video; Feb. 12, 2015; No Pages, 1:15 Long; No Volume-Issue Numbers, Webpage https://www.youtube.com/watch?v=JfOplKJyrHs; Youtube; Internet Publication.

(Continued)

*Primary Examiner* — Kavel Singh

(57) ABSTRACT

A lane forming apparatus can include a first arm, a second arm, a moving device, and at least one supporting device. The first arm can be disposed for lateral, pivoting movement about a pivot axis and across a rectilinear path. The second arm can be telescopically engaged with the first arm and extend between a proximal end and a distal end. The moving device can be engaged with the distal end and configured to move the distal end in at least two dimensions relative to the pivot axis. The supporting device can be positioned on an underside of one of the first arm and the second arm and can be configured to bear at least a portion of a weight of at least one of the first arm and the second arm during the lateral, pivoting movement.

20 Claims, 8 Drawing Sheets

(56) References Cited

U.S. PATENT DOCUMENTS

| | | | |
|---|---|---|---|
| 6,516,938 | B1 | 2/2003 | Paselsky et al. |
| 6,772,872 | B2 | 8/2004 | Spangeberg et al. |
| 7,210,568 | B2 | 5/2007 | Cull et al |
| 7,232,026 | B2 | 6/2007 | Heuft et al. |
| 7,331,444 | B2 * | 2/2008 | Barilovits ............... B65G 15/14 198/626.3 |
| 7,461,734 | B2 * | 12/2008 | Mignano ............... B65G 47/648 198/353 |
| 7,543,697 | B2 | 6/2009 | Legallais |
| 7,658,274 | B2 | 2/2010 | Mignano |
| 8,257,012 | B2 * | 9/2012 | Silva ....................... B65G 57/06 414/792.6 |
| 8,371,433 | B2 | 2/2013 | Jendrichowski |
| 8,807,319 | B2 | 8/2014 | Borghi et al. |

OTHER PUBLICATIONS

Apollo Engineering; Apollo Engineering Lane Divider and Side Loader; Video; Oct. 18, 2009; No Pages, 15:30 Long; No Volume-Issue Numbers, Webpage https://www.youtube.com/watch?v=zfznKq-mgwQ; Youtube; Internet Publication.
Paxona SFT; Divider Diverter Laner for Ketchup; Video; Sep. 6, 2009; No Pages, 1:36 Long; No Volume-Issue Numbers, Webpage https://www.youtube.com/watch?v=ELXt_rp3da0; Youtube; Internet Publication.
Paxona SFT; Bottle Divider Diverter Synchro Laner; Video; Sep. 6, 2009; No Pages, 1:01 Long; No Volume-Issue Numbers, Webpage https://www.youtube.com/watch?v=ifkMwbnms2Y; Youtube; Internet Publication.
Paxona SFT; High speed conveyor bottle divider diverter laner; Video; Apr. 16, 2010; No Pages, 0:25 Long; No Volume-Issue Numbers, Webpage https://www.youtube.com/watch?v=mW9D5D5ltE8; Youtube; Internet Publication.
Schneider Pack; High Speed Laner; Video; Jun. 13, 2013; No Pages, 1:21 Long; No Volume-Issue Numbers, Webpage https://www.youtube.com/watch?v=pcCmYYUyiL0; Youtube; Internet Publication.
Standard-Knapp Inc.; High Speed Servo Laner; Video; Jan. 7, 2013; No Pages, 0:58 Long; No Volume-Issue Numbers, Webpage https://www.youtube.com/watch?v=TD7TqdGXuds; Youtube; Internet Publication.
Productive Systems; Multi lane bottle diverter; Video; Jul. 18, 2012; No Pages, 0:24 Long; No Volume-Issue Numbers, Webpage https://www.youtube.com/watch?v=J6JGmsKfR8c; Youtube; Internet Publication.
Vanta; Vanta-Lane Divider EDQ36 (Suitable for 36000BPH); Video; Jul. 30, 2013; No Pages, 5:16 Long; No Volume-Issue Numbers, Webpage https://www.youtube.com/watch?v=q1WLJjq2www; Youtube; Internet Publication.

\* cited by examiner

LANE FORMING APPARATUS

CROSS-REFERENCE TO RELATED APPLICATIONS

This application claims the benefit of U.S. Provisional Patent Application Ser. No. 62/036,531 for a LANE FORMING APPARATUS, filed on Aug. 12, 2014, which is hereby incorporated by reference in its entirety.

BACKGROUND

1. Field

The invention relates to an apparatus for diverting articles traveling in a single lane to one of a plurality of parallel lanes.

2. Description of Related Prior Art

Devices for diverting articles traveling in a single lane to a plurality of parallel lanes are known. U.S. Pat. No. 4,830,173 discloses an INDEXING APPARATUS FOR ALIGNING ARTICLES IN PARALLEL ROLLS [sic]. U.S. Pat. No. 5,944,165 discloses a LANE DISTRIBUTION APPARATUS. U.S. Pat. No. 6,772,872 discloses an APPARATUS FOR DIVERTING SUCCESSIVE ARTICLES IN A SINGLE LANE TO PLURAL LANES.

SUMMARY

A lane forming apparatus can include a first arm, a second arm, a moving device, and at least one supporting device. The first arm can be disposed for lateral, pivoting movement about a pivot axis and across a rectilinear path. The second arm can be telescopically engaged with the first arm and extend between a proximal end and a distal end. The proximal end can be closer to the pivot axis than the distal end. The moving device can be engaged with the distal end and configured to move the distal end in at least two dimensions relative to the pivot axis such that a distance between the pivot axis and the distal end is variable. The at least one supporting device can be positioned on an underside of one of the first arm and the second arm. The at least one supporting device can be configured to bear at least a portion of a weight of at least one of the first arm and the second arm during the lateral, pivoting movement.

BRIEF DESCRIPTION OF THE DRAWINGS

The detailed description set forth below references the following drawings.

DETAILED DESCRIPTION OF AN EXEMPLARY EMBODIMENT

Figure 1:
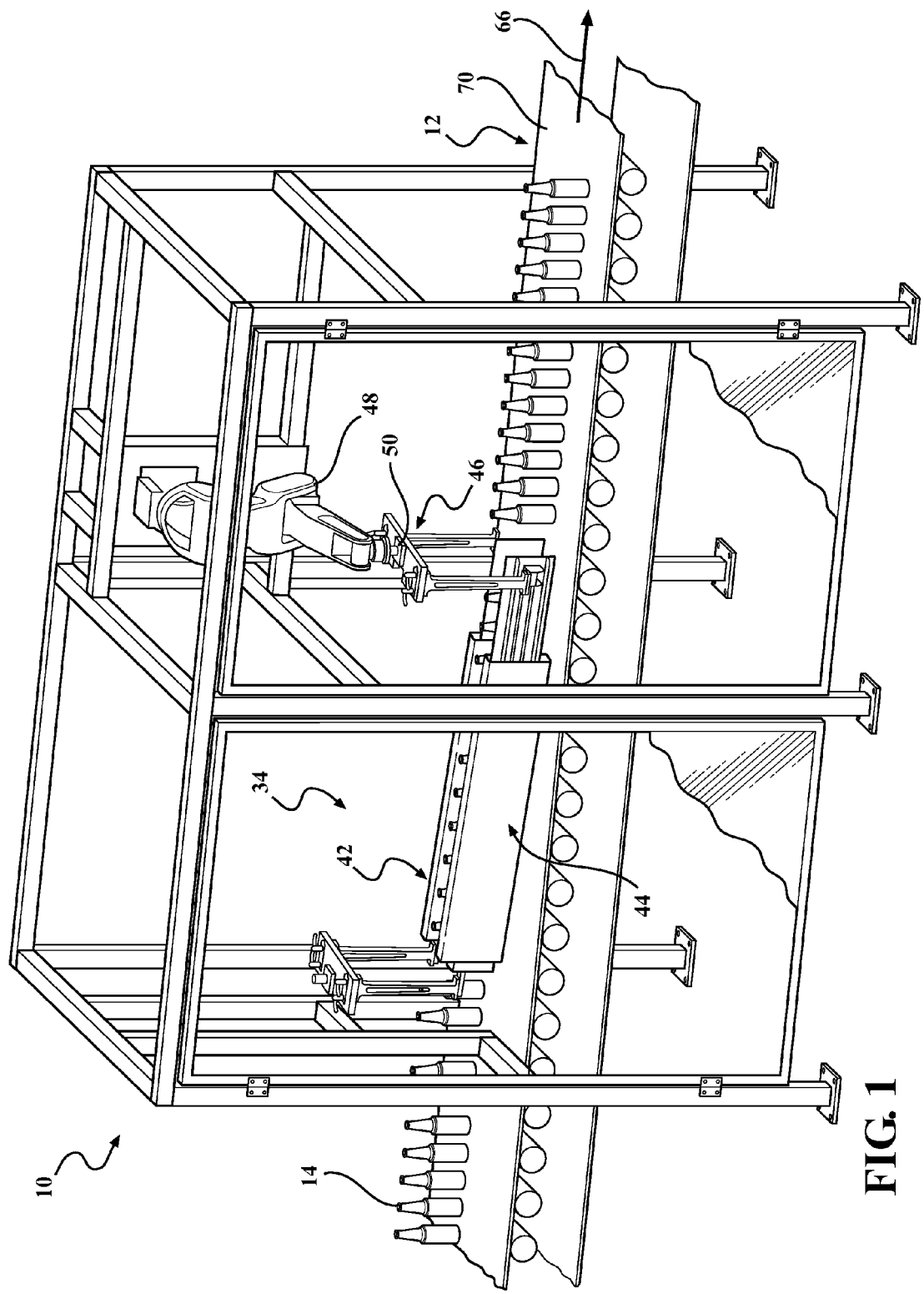
FIG. 1 is a perspective view of a lane forming apparatus constructed in accordance with an exemplary embodiment of the present disclosure.

A plurality of different embodiments of the present disclosure is shown in the Figures of the application. Similar features are shown in the various embodiments of the present disclosure. Similar features across different embodiments have been numbered with a common reference numeral and have been differentiated by an alphabetic suffix. Similar features in a particular embodiment have been numbered with a common two-digit, base reference numeral and have been differentiated by a different leading numeral. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The present disclosure, as demonstrated by the exemplary embodiment described below, can provide an apparatus for diverting articles traveling in a single lane to any one of a plurality of different, parallel lanes. The exemplary embodiment can include a single, relatively small robotic arm to move a guide assembly for the articles. The exemplary embodiment can be more robust than existing lane forming devices and can be more easily adjustable to accommodate articles of different shapes and sizes.

Figure 2:
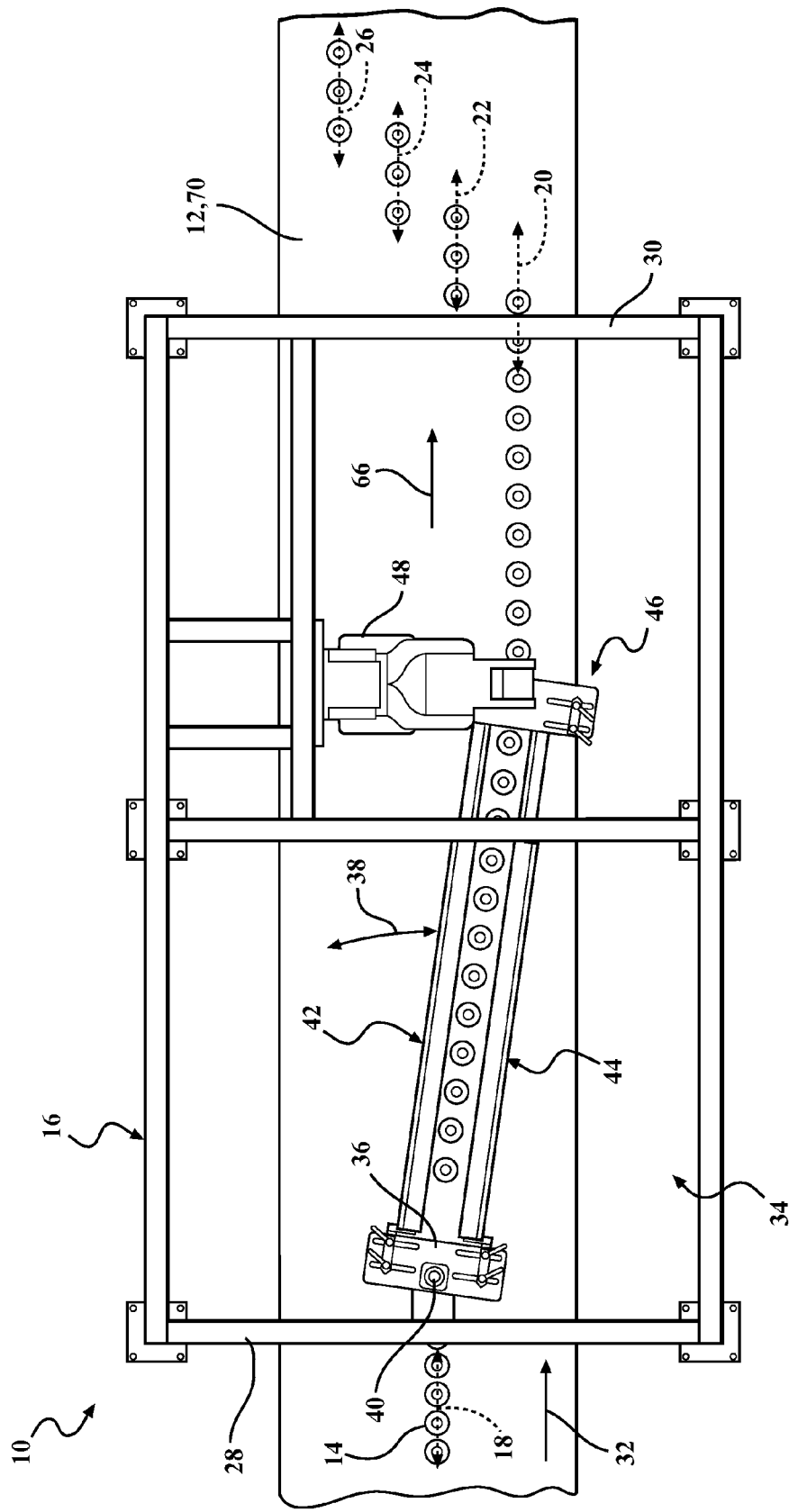
FIG. 2 is a top view of the lane forming apparatus shown in FIG. 1.

Referring now to FIGS. 1 and 2, in one or more embodiments of the present disclosure, a lane forming apparatus 10 can include a conveyor 12. Articles, such as article 14, can be moved along a rectilinear path 66 by the conveyor 12. The exemplary articles 14 are bottles, however, embodiments of the present disclosure can be practiced with articles other than bottles.

Referring now to FIG. 2, the lane forming apparatus 10 can include a frame 16. The articles 14 can enter an upstream end 28 of the frame 16 traveling in a single lane, referenced by axis 18. The direction of travel is referenced by arrow 32. The lane forming apparatus 10 can be operable to divert the articles 14 from lane or axis 18 to any one of a plurality of different lanes, such as lanes represented by axes 20, 22, 24, or 26. The axes 20, 22, 24, 26 can be parallel to one another and to the rectilinear path 66. The articles 14 can exit a downstream end 30 of the frame 16, each article 14 positioned along one of the axes 20, 22, 24, or 26.

With continuing reference to FIG. 2, the lane forming apparatus 10 can include a guide assembly 34 for diverting the articles 14. The guide assembly 34 can include a base 36 mounted for pivoting movement on the frame 16. The pivoting movement is referenced at 38 and is centered on a pivot pin or pivot axis referenced at 40. The pivoting movement 38 is lateral (or side-to-side) relative to the rectilinear path 66. The guide assembly 34 can also include arm assemblies 42, 44 extending from the base 36. The arm assemblies 42, 44 can be mirror images of one another and be disposed on opposite sides of the articles 14.

Figure 3:
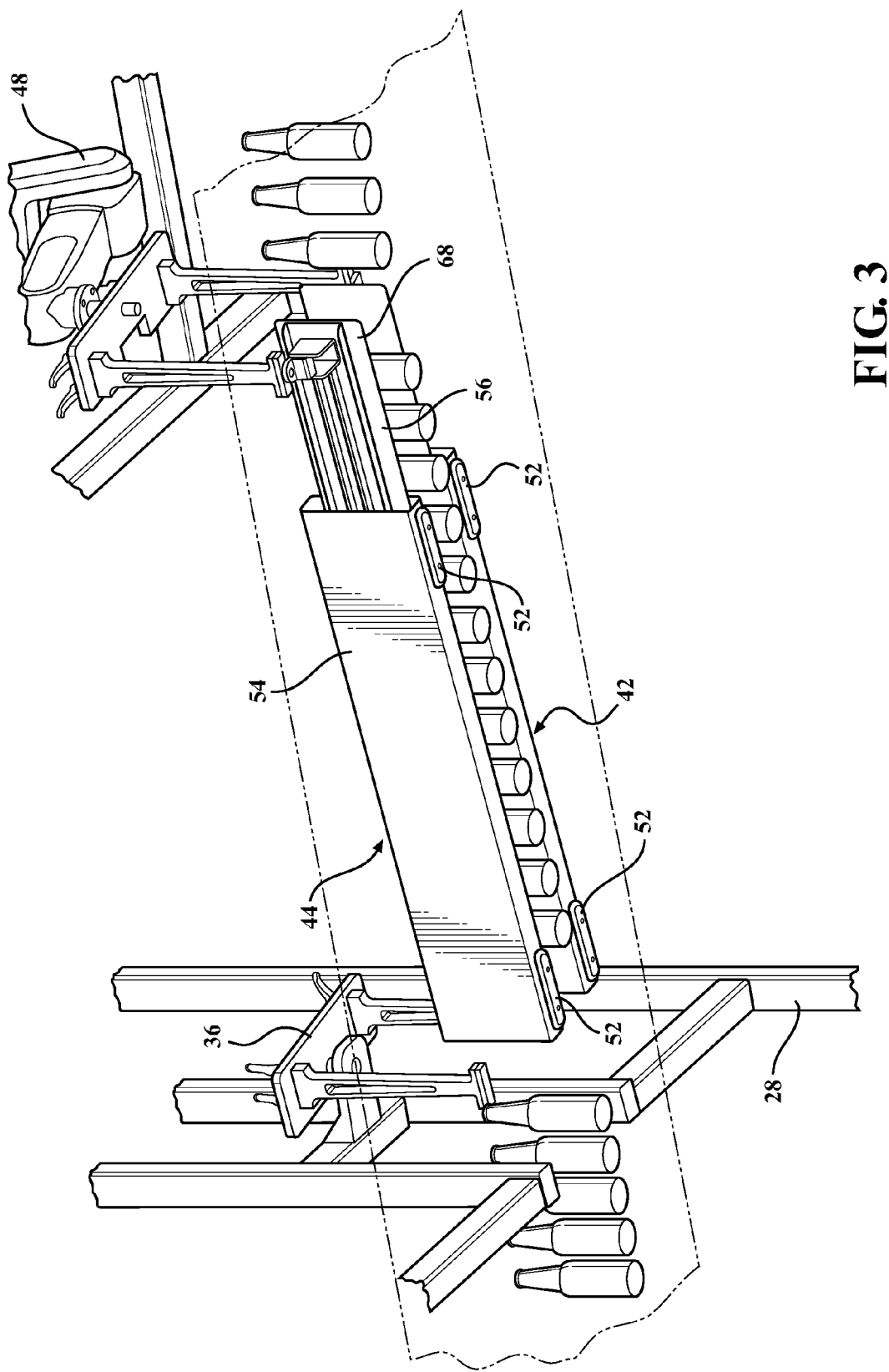
FIG. 3 is a perspective view from an underside of the lane forming apparatus shown in FIGS. 1 and 2 wherein a conveyor has been removed.

Referring now to FIG. 3 and by way of example and not limitation, the arm assembly 44 can include a first arm 54. The first arm 54 can be disposed for lateral, pivoting movement about the pivot axis 40 and across a rectilinear path 66. The arm assembly 44 can include a second arm 56. The second arm 56 can be telescopically engaged with the first arm 54. The second arm 56 can extend between a proximal end and a distal end 68. The proximal end can be closer to the pivot axis 40 than the distal end 68 and in the exemplary embodiment is concealed within the first arm 54.

The articles 14 can be guided in lateral movement relative to the conveyor 12 by the arm assemblies 42, 44. The lateral movement can be across the rectilinear path 66 and can occur as the article 14 concurrently moves along the rectilinear path 66. When the article 14 passes from between the arm assemblies 42, 44, the article 14 can be positioned on one of the lanes/axes 20, 22, 24, or 26.

Referring again to FIG. 1, the guide assembly 34 can also include a carriage 46. Each of the arm assemblies 42, 44 can be pivotally engaged with the carriage 46. The carriage is connected to the distal ends of each of the arm assemblies, including the distal end 68. The carriage 46 and the base 36 can allow the gap between the arm assemblies 42, 44 to be varied.

The lane forming apparatus 10 can include a moving device engaged with the carriage 46. Thus, the moving device can be engaged with the distal ends through the carriage 46 in the exemplary embodiment of the present disclosure. The moving device can be configured to move the distal end 68 in at least two dimensions relative to the pivot axis 40 such that a distance between the pivot axis 40 and the distal end 68 is variable.

In one or more embodiments of the present disclosure, the moving device can be a six-axis robotic arm 48 operable to engage and move the distal end 68 through the carriage 46, thereby moving the arm assemblies 42, 44 and pivoting the base 36 about the pivot axis 40. The robot arm 48 can be a six-axis articulated robot with rotary joints. The robot arm 48 is suspended above the conveyor 12 in the exemplary embodiment but could be positioned elsewhere in other embodiments, such as on the side of the conveyor 12.

In the exemplary embodiment, the six-axis robotic arm 48 need only move the distal end 68 in two dimensions relative to the pivot axis 40. In the illustrated embodiment, the robotic arm 48 can engage a post 50 of the carriage 46. The robotic arm 48 can move the carriage 46 in the X-Y plane. The robotic arm 48 can move the carriage 46 in order to position the downstream gap between the arm assemblies 42, 44 at a desired position so that an article 14 passing from between the arm assemblies 42, 44 is positioned on a desired lane/axis.

The lane forming device 10 can also include at least one supporting device that can be positioned on an underside of one of the first arm 54 and the second arm 56. The at least one supporting device can be configured to bear at least a portion of a weight of at least one of the first arm 54 and the second arm 56 during the lateral, pivoting movement. In the exemplary embodiment, the at least one supporting device is positioned on the underside of the first arm 54 and configured to bear substantially all of the weight of the first arm 54 and the second arm 56 during the lateral, pivoting movement. The first arm 54 has a first height extending between a first top 55 and a first bottom 57. The second arm 56 has a second height extending between a second top 59 and a second bottom 61. The at least one supporting device is positioned closer to the bottom of one of the first arm 54 and the second arm 56 than the top of the one of the first arm 54 and the second arm 56. The conveyor 12 can be moving along the rectilinear path 66 while the first arm 54 concurrently moves in the lateral, pivoting movement such that the at least one supporting device is sliding on the conveyor 12 in an instantaneous direction that is transverse to the rectilinear path 66.

Referring now to FIG. 3, the exemplary lane forming device 10 includes a supporting device in the form a plurality of rails, such as referenced at 52. The rails 52 are unitary structures and are spaced from one another. The rails 52 can act as bearings between the arm assemblies 42, 44 and the conveyor (not visible in FIG. 3). The exemplary rails 52 can be formed from ultra-high-molecular-weight polyethylene (UHMWPE or UHMW). As a result, the rails 52 can be self-lubricating.

The arm assemblies 42, 44 can be supported by the conveyor 12 and the rails 52 can reduce the friction arising from movement of the arm assemblies 42, 44 across the conveyor. The rails are positioned between the first arm 54 and the conveyor 12. The first arm 54 slides across the conveyor 12 while resting on the rails during the lateral, pivoting movement.

A first coefficient of friction can be defined between the first arm 54 the upper surface 70 of the conveyor 12. A second coefficient of friction can be defined between the at least one supporting device and the conveyor 12. The second coefficient of friction can be less than the first coefficient of friction. It is noted that a coefficient of friction is a dimensionless, scalar value which describes the ratio of the force of friction between two bodies and the force pressing them together. The coefficient of friction depends on the materials being considered. For example, ice on steel has a low coefficient of friction while rubber on pavement has a high coefficient of friction. The first coefficient of friction discussed above is a theoretical value since in the exemplary embodiment of the present disclosure the first arm 54 does not contact the belt of the conveyor 12, but rests on the rails 52 which contacts the conveyor 12. However, the first coefficient of friction is discussed to note that the supporting device reduces friction associated with the lateral, pivoting movement.

Figure 4:
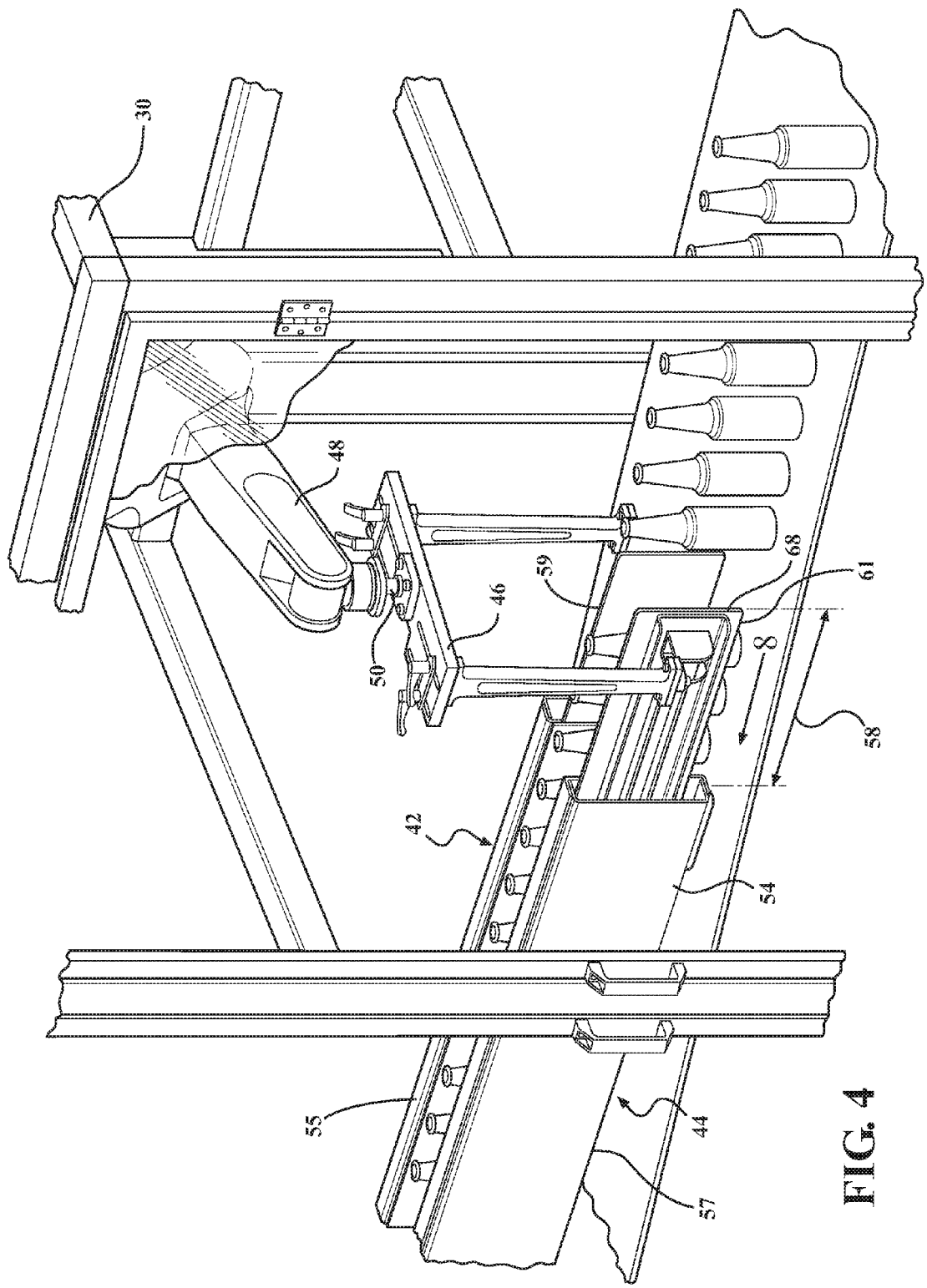
FIG. 4 is a perspective view of a robotic arm of the lane forming apparatus shown in FIGS. 1-3.
Figure 9:
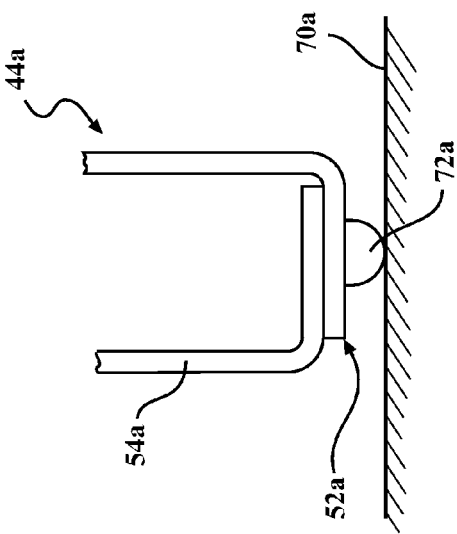
FIG. 9 is a detail view analogous to FIG. 8 but of a different embodiment of the present disclosure.
Figure 10:
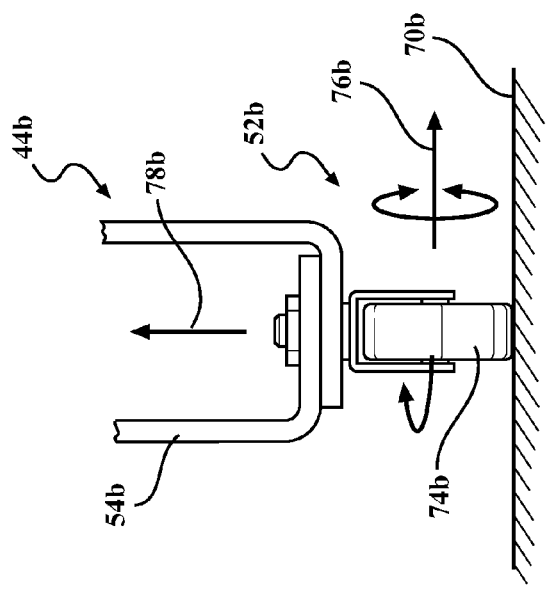
FIG. 10 is a detail view analogous to FIG. 8 but of a different embodiment of the present disclosure.
Figure 8:
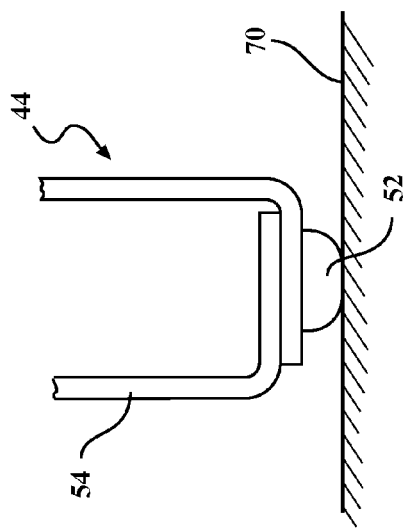
FIG. 8 is a detail view taken from the perspective of detail arrow 8 in FIG. 4.

FIG. 8 is a detail view taken from the perspective of detail arrow 8 in FIG. 4. FIG. 8 illustrates the rail 52 disposed on the underside of the first arm 54 of an arm assembly 44. The first arm 54 can slide along the surface 70 through the rail 52. FIG. 9 is a detail view analogous to FIG. 8 but of a different embodiment of the present disclosure. A supporting device 52a includes a spherical ball bearing 72a disposed on the underside of the first arm 54a of an arm assembly 44a. The first arm 54a can move as the ball bearing 72a rolls along the surface 70a. FIG. 10 is a detail view analogous to FIG. 8 but of a different embodiment of the present disclosure. A supporting device 52b is a caster having a wheel 74b disposed on the underside of the first arm 54b of an arm assembly 44b. The first arm 54b can move as the wheel 74b rolls along the surface 70b. The wheel 74b can rotate about an axis 76b and about an axis 78b.

Referring now to FIGS. 4-7, each of the arm assemblies 42, 44 can be operable to telescope and be adjustable to a plurality of different configurations. Each configuration can be defined by a different telescopic length. FIG. 4 shows the arm assembly 44 having the first arm 54 and the second arm 56. The first arm 54 can be connected to the base (not visible in FIG. 4) and the second arm 56 can be connected to the carriage 46. In FIG. 4, the arm assembly 44 is illustrated in a first configuration having a first telescopic length referenced at 58. The arm assembly 42 can have a similar telescopic length.

Figure 5:
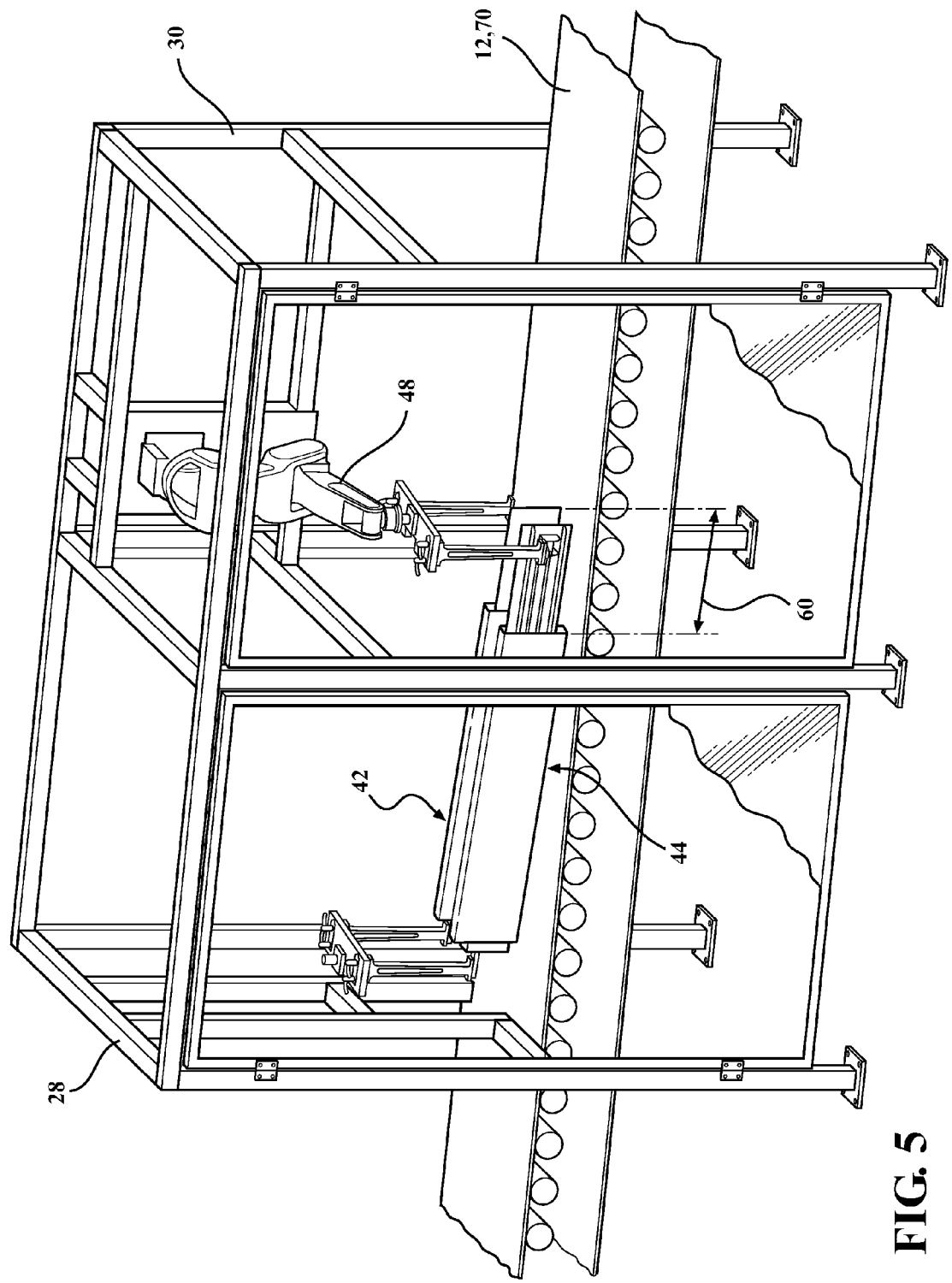
FIG. 5 is a perspective view of the lane forming apparatus shown in FIGS. 1-4 wherein a guide assembly is in a generally refracted configuration.
Figure 6:
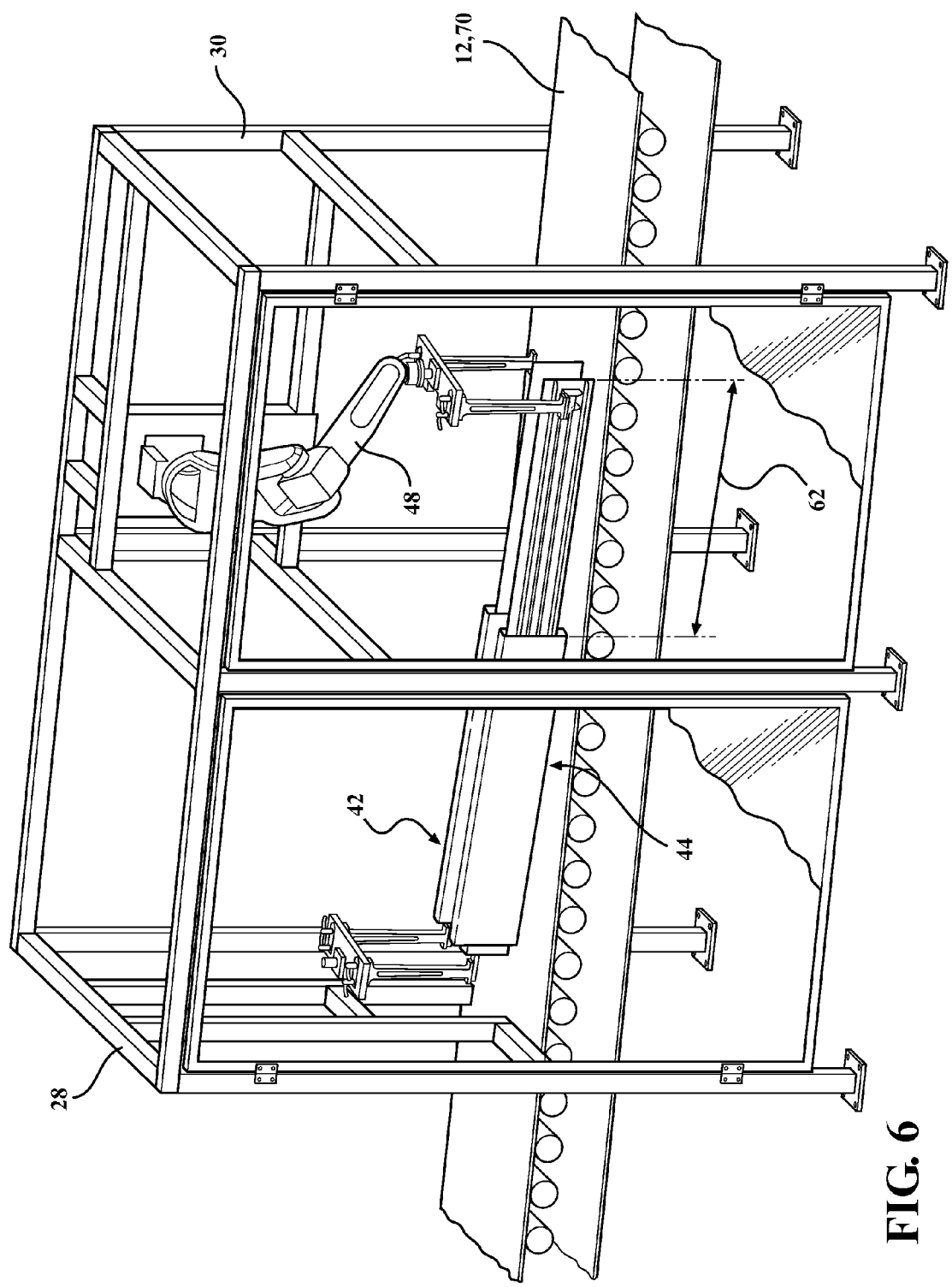
FIG. 6 is a perspective view of the lane forming apparatus shown in FIGS. 1-5 wherein the guide assembly is in a partially extended configuration.
Figure 7:
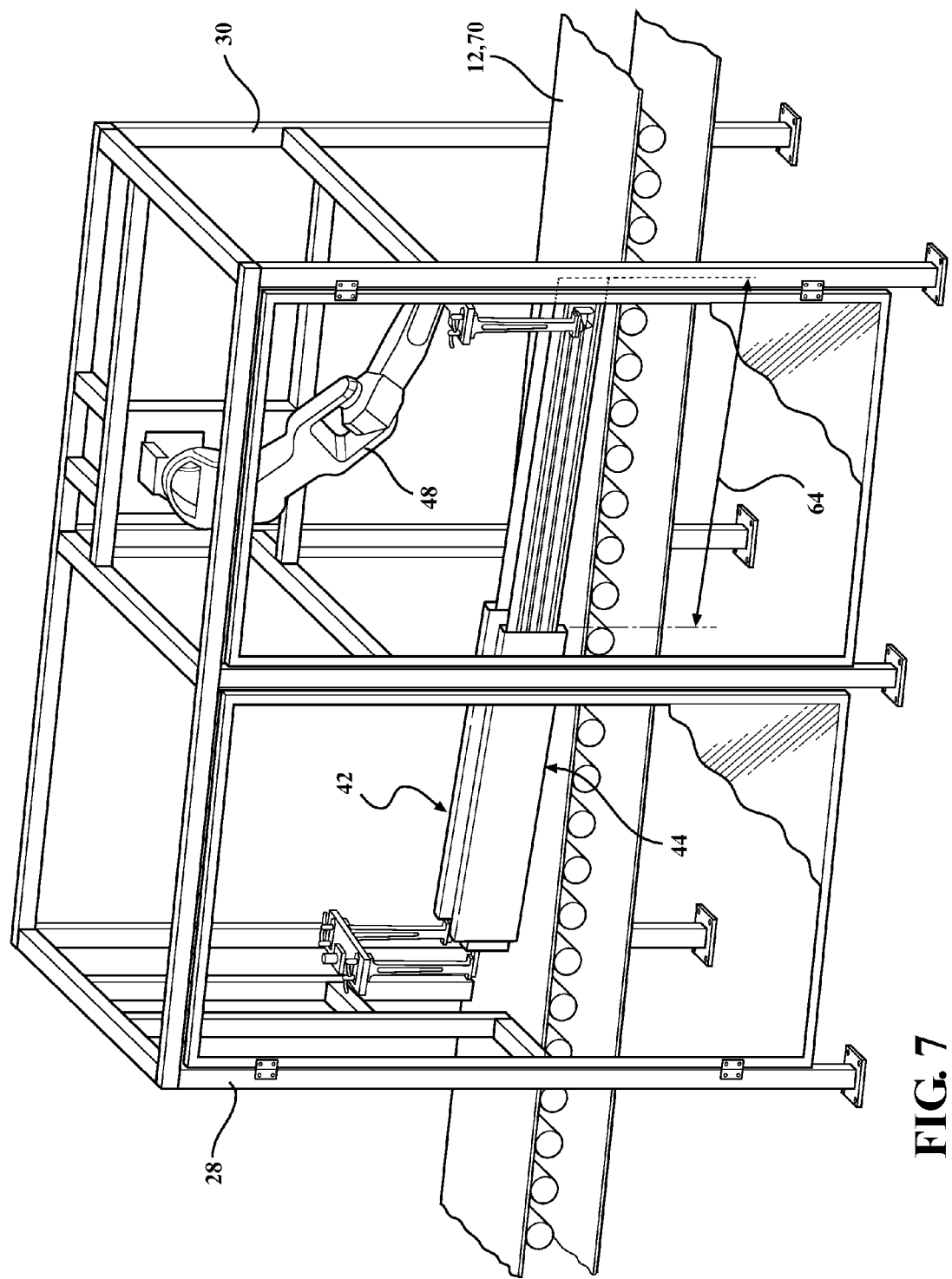
FIG. 7 is a perspective view of the lane forming apparatus shown in FIGS. 1-6 wherein the guide assembly is generally in a fully extended configuration.

FIG. 5 illustrates the arm assembly 44 in a second configuration having a second telescopic length referenced at 60. The second telescopic length 60 is greater than the first telescopic length 58. FIG. 6 illustrates the arm assembly 44 in a third configuration having a third telescopic length referenced at 62. The third telescopic length 62 is greater than the second telescopic length 60. FIG. 7 illustrates the arm assembly 44 in a fourth configuration having a fourth telescopic length referenced at 64. The fourth telescopic length 64 is greater than the third telescopic length 62.

The robotic arm 48 can cause the arm assemblies 42, 44 to telescope during pivoting movement 38. By telescoping during pivoting movement, the lane forming apparatus 10 can increase the accuracy of placement of the articles 14 in a desired lane.

In operation, the arm assemblies 42, 44 can be in a first position, such as shown in FIG. 2, and be directing the articles 14 into the lane 20. When it is desired to position articles 14 in another lane, such as lane 22, the robotic arm 48 can move the carriage 46 both along the rectilinear path 66 in the direction of movement of the conveyor 12 as well as laterally. The movement along the rectilinear path 66 is at the same speed as the movement of the conveyor 12. The movement along the rectilinear path 66 in the direction of movement of the conveyor 12 causes the arm assemblies 42, 44 to telescopically extend. The lateral movement repositions the gap between the arm assemblies 42, 44 from the first position in which the gap is generally centered on the lane 20 to a second position in which the gap is generally centered on the lane 22. When the gap reaches the second position, the movement along the rectilinear path 66 in the direction of movement of the conveyor 12 and telescopic extension can cease.

Also, when gap reaches the second position, the robotic arm 48 can move the carriage 46 along the rectilinear path 66 in the opposite direction of movement of the conveyor 12, while making any lateral movement necessary for keeping the gap centered on the lane 22. This movement can cause the arm assemblies 42, 44 to telescopically retract and can continue until the arm assemblies 42, 44 are retracted as much as desired. The arm assemblies 42, 44 are thus in position to again change the lane of the articles 14 when desired.

Since the guide assembly 34 can rest on the conveyor 12, the moving device can be smaller than if the guide assembly 34 was cantilevered off the pivot axis 40. The robotic arm 48 can have a payload capacity of less than twenty pounds. Alternatively, the robotic arm 48 can have a payload capacity of less than fifty pounds or less than one hundred pounds. For example, in one embodiment of the present disclosure, the guide assembly 34 can weigh one hundred and twenty-five pounds. A robotic arm for the embodiment can be a Fanuc LR Mate 200iD/7L, which has a rated capacity or payload of 7 kg (15.4 lb). If the guide arm assembly 34 were suspended from the frame 16 instead of configured to rest on the conveyor 12, a Fanuc robot, which has a rated capacity or payload of 35 kg (77 lb) pounds, would be required.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein as other inventions in other patent documents is hereby unconditionally reserved.

What is claimed is:

1. A lane forming apparatus comprising:
a first arm disposed for lateral, pivoting movement about a pivot axis and across a rectilinear path, said first arm having a first height extending between a first top and a first bottom;
a second arm telescopically engaged with said first arm and extending between a proximal end and a distal end, said proximal end closer to said pivot axis than said distal end, said second arm having a second height extending between a second top and a second bottom;
a moving device engaged with said distal end and configured to move said distal end in at least two dimensions relative to said pivot axis such that a distance between said pivot axis and said distal end is variable; and
at least one supporting device positioned on an underside of one of said first arm and said second arm, said at least one supporting device positioned closer to said bottom of said one of said first arm and said second arm than said top of said one of said first arm and said second arm, wherein said at least one supporting device is configured to bear at least a portion of a weight of at least one of said first arm and said second arm during said lateral, pivoting movement.

2. The lane forming apparatus of claim 1 wherein said at least one supporting device is configured to bear substantially all of the weight of said first arm and said second arm during said lateral, pivoting movement.

3. The lane forming apparatus of claim 1 wherein said at least one supporting device is further defined as positioned on said underside of said first arm.

4. The lane forming apparatus of claim 1 wherein said at least one supporting device is further defined as a plurality of supporting devices spaced from one another.

5. The lane forming apparatus of claim 1 wherein said at least one supporting device is further defined as self-lubricating.

6. The lane forming apparatus of claim 1 wherein said at least one supporting device is further defined as a rail.

7. The lane forming apparatus of claim 1 wherein said at least one supporting device is further defined as spherical.

8. The lane forming apparatus of claim 1 wherein said at least one supporting device is further defined as including a wheel.

9. A lane forming apparatus comprising:
a first arm disposed for lateral, pivoting movement about a pivot axis and across a rectilinear path;
a second arm telescopically engaged with said first arm and extending between a proximal end and a distal end, said proximal end closer to said pivot axis than said distal end;
a moving device engaged with said distal end and configured to move said distal end in at least two dimensions relative to said pivot axis such that a distance between said pivot axis and said distal end is variable;

at least one supporting device positioned on an underside of one of said first arm and said second arm, wherein said at least one supporting device is configured to bear at least a portion of a weight of at least one of said first arm and said second arm during said lateral, pivoting movement; and wherein said moving device is further defined as a six-axis robotic arm.

10. The lane forming apparatus of claim 9 wherein said six-axis robotic arm has a payload capacity of less than twenty pounds.

11. The lane forming apparatus of claim 9 wherein said distal end is moved by said six-axis robotic arm in only two dimensions relative to said pivot axis.

12. A lane forming apparatus comprising:
a first arm disposed for lateral, pivoting movement about a pivot axis and across a rectilinear path;
a second arm telescopically engaged with said first arm and extending between a proximal end and a distal end, said proximal end closer to said pivot axis than said distal end;
a moving device engaged with said distal end and configured to move said distal end in at least two dimensions relative to said pivot axis such that a distance between said pivot axis and said distal end is variable;
at least one supporting device positioned on an underside of one of said first arm and said second arm, wherein said at least one supporting device is configured to bear at least a portion of a weight of at least one of said first arm and said second arm during said lateral, pivoting movement; and
a conveyor extending along the rectilinear path, wherein said at least one supporting device is positioned between said one of said first arm and said second arm and said conveyor, wherein said at least one supporting device is slidable on said conveyor, and wherein said one of said first arm and said second arm slides across said conveyor resting on said at least one supporting device during said lateral, pivoting movement.

13. The lane forming apparatus of claim 12 wherein said at least one supporting device is further defined as a plurality of rails each formed from plastic and spaced from one another along said underside of said first arm.

14. The lane forming apparatus of claim 12 wherein said conveyor is configured to move along the rectilinear path while said first arm concurrently moves in said lateral, pivoting movement such that at least a portion of said at least one supporting device is rolling on said conveyor.

15. The lane forming apparatus of claim 14 wherein said at least one supporting device is further defined as a castor.

16. The lane forming apparatus of claim 12 wherein said moving device is an articulated robot.

17. The lane forming apparatus of claim 12 wherein said moving device is suspended above said conveyor.

18. A lane forming apparatus comprising:
a first arm disposed for lateral, pivoting movement about a pivot axis and across a rectilinear path;
a second arm telescopically engaged with said first arm and extending between a proximal end and a distal end, said proximal end closer to said pivot axis than said distal end;
a moving device engaged with said distal end and configured to move said distal end in at least two dimensions relative to said pivot axis such that a distance between said pivot axis and said distal end is variable;
at least one supporting device positioned on an underside of one of said first arm and said second arm, wherein said at least one supporting device is configured to bear at least a portion of a weight of at least one of said first arm and said second arm during said lateral, pivoting movement;
a conveyor extending along the rectilinear path, wherein said at least one supporting device is positioned between said one of said first arm and said second arm and said conveyor, and wherein said one of said first arm and said second arm slides across said conveyor resting on said at least one supporting device during said lateral, pivoting movement; and
wherein a first coefficient of friction is defined between said one of said first arm and said second arm and said conveyor, a second coefficient of friction is defined between said at least one supporting device and said conveyor, and said second coefficient of friction is less than said first coefficient of friction.

19. A lane forming apparatus comprising:
a first arm disposed for lateral, pivoting movement about a pivot axis and across a rectilinear path;
a second arm telescopically engaged with said first arm and extending between a proximal end and a distal end, said proximal end closer to said pivot axis than said distal end;
a moving device engaged with said distal end and configured to move said distal end in at least two dimensions relative to said pivot axis such that a distance between said pivot axis and said distal end is variable;
at least one supporting device positioned on an underside of one of said first arm and said second arm, wherein said at least one supporting device is configured to bear at least a portion of a weight of at least one of said first arm and said second arm during said lateral, pivoting movement;
a conveyor extending along the rectilinear path, wherein said at least one supporting device is positioned between said one of said first arm and said second arm and said conveyor, and wherein said one of said first arm and said second arm slides across said conveyor resting on said at least one supporting device during said lateral, pivoting movement; and
wherein said conveyor is configured to move along the rectilinear path while said first arm concurrently moves in said lateral, pivoting movement such that said at least one supporting device is sliding on said conveyor in an instantaneous direction transverse to the rectilinear path.

20. A method comprising:
disposing a first arm for lateral, pivoting movement about a pivot axis and across a rectilinear path;
telescopically engaging a second arm with the first arm wherein the second arm extends between a proximal end and a distal end, the proximal end closer to the pivot axis than the distal end;
engaging a moving device with the distal end wherein the moving device is configured to move the distal end in at least two dimensions relative to the pivot axis such that a distance between the pivot axis and the distal end is variable;
positioning at least one supporting device on an underside of one of the first arm and the second arm, wherein the at least one supporting device is configured to bear at least a portion of a weight of at least one of the first arm and the second arm during the lateral, pivoting movement; and sliding the least one supporting device on a conveyor extending along the rectilinear path.

\* \* \* \* \*